(12) United States Patent
Hsu et al.

(10) Patent No.: US 7,239,532 B1
(45) Date of Patent: Jul. 3, 2007

(54) PRIMARY-SIDE FEEDBACK SWITCHING POWER SUPPLY

(75) Inventors: Da-Jing Hsu, Taipei County (TW); Hui-Qiang Yang, Taipei County (TW)

(73) Assignee: Niko Semiconductor Ltd. (TW)

( * ) Notice: Subject to any disclaimer, the term of this patent is extended or adjusted under 35 U.S.C. 154(b) by 0 days.

(21) Appl. No.: 11/645,772

(22) Filed: Dec. 27, 2006

(51) Int. Cl.
*H02M 3/335* (2006.01)

(52) U.S. Cl. .............................. 363/21.12; 363/21.16; 363/21.18

(58) Field of Classification Search ............. 363/21.12, 363/21.16, 21.17, 21.18
See application file for complete search history.

(56) References Cited

U.S. PATENT DOCUMENTS 5,745,358 A * 4/1998 Faulk ........................ 363/95
5,841,641 A * 11/1998 Faulk ...................... 363/21.14
6,101,105 A * 8/2000 Gilmore ................. 363/21.15
6,853,563 B1 * 2/2005 Yang et al. .............. 363/21.15
7,027,313 B2 * 4/2006 Amei ...................... 363/21.12

* cited by examiner

*Primary Examiner*—Bao Q. Vu (57) ABSTRACT

The present invention discloses a primary-side feedback switching power supply that uses a sample-and-hold circuit to obtain a corner voltage of a harmonic wave voltage while the primary-side auxiliary winding is operating at a discontinuous mode as a feedback control, and provides both voltage regulation and current limit functions. A stable voltage output is provided within the nominal input voltage and nominal output load, such that when the output reaches a current limit, the output voltage drops but the output current is controlled to remain unchanged, so as to provide an over-current protection.

7 Claims, 8 Drawing Sheets

PRIMARY-SIDE FEEDBACK SWITCHING POWER SUPPLY

FIELD OF THE INVENTION

The present invention relates to a primary-side feedback switching power supply, and more particularly to a switching power supply capable of maintaining a constant output voltage and constant current, the constant current activates when the output current is restricted and the output voltage is dropped, so as to achieve the over-current protection function.

BACKGROUND OF THE INVENTION

At present, switching power supplies are used extensively and replace linear regulated power supplies, but a switching power supply must rely on a pulse width modulation (PWM) controller to control the ON/OFF time of a power transistor. The PWM controller outputs a voltage or a current based on the output voltage/current and power to generate each feedback signal to modulate the pulse width outputted by the PWM controller to produce appropriate ON/OFF time. A conventional switching power supply usually cannot meet the requirements of different output voltage regulation very well by a primary-side feedback method, and thus most feedback signals of switching power supplies must be obtained by a secondary side and an optical coupler transmits a secondary-side feedback signal to the primary side to control the output pulse signal of the PWM controller. Therefore, feedback and current limit components including the photo-coupler, shunt regulator, current limit resistor and operational amplifier must be used in the switching power supplies.

Figure 1:
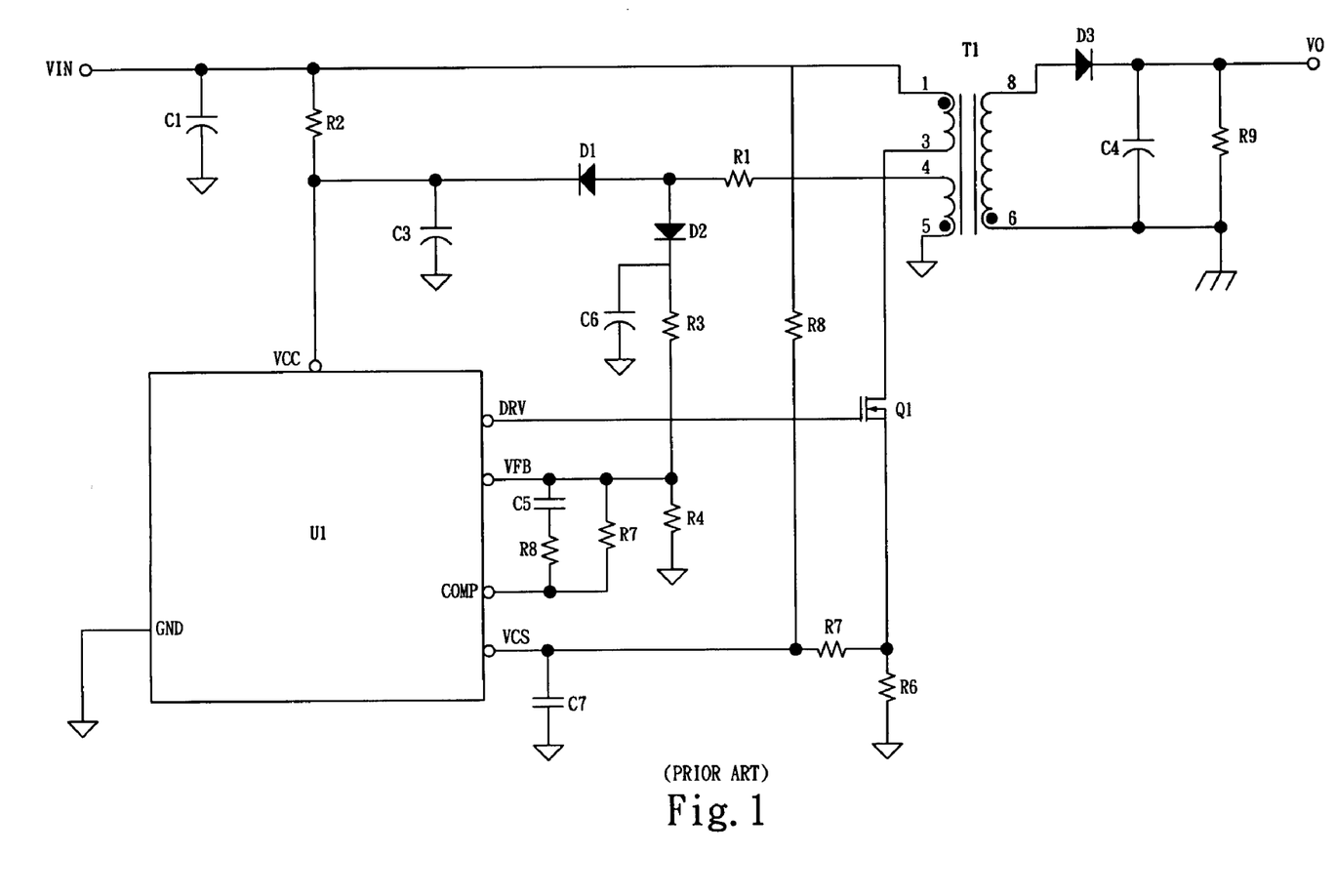
FIG. 1 is a circuit block diagram of a conventional primary-side feedback switching power supply.

Referring to FIG. 1 for a circuit block diagram of a conventional primary-side feedback switching power supply, a circuit is started to supply a current from a DC input power source VIN to a resistor R2 to charge a capacitor C3. If the source voltage VCC reaches a voltage large enough to start the PWM controller U1, the PWM controller U1 will start outputting a pulse wave to control a power transistor Q1. If the power transistor Q1 is conducted electrically, a current will be supplied from the DC input power source VIN and passed through a primary-side coil of a transformer T1 and the transistor Q1 and then returned to a negative terminal of the input voltage VIN. Since a diode D3 has a polarity opposite to that of the output winding on the secondary side, therefore the energy cannot be transmitted from the primary side to the output terminal, but the energy is temporarily stored in the transformer T1 instead. If the primary-side current detects that the voltage of a resistor R6 has reached a voltage reference value, then the power transistor Q1 will become OFF. At the time, the polarities of both diode D3 and output winding become positive on the secondary side, and thus the energy stored in the transformer T1 will be transmitted to an output terminal VO, and an output capacitor C4 will be charged for several cycles to an output voltage regulated point. On the other hand, the voltage of a primary-side auxiliary winding provides a current to the supply source voltage VCC via a resistor R1 and a diode D1, and supplies the current to the PWM controller U1. In another path of the auxiliary winding, the current is passed through the resistor R1 and diode D2 and rectified with a capacitor C6 to become a DC voltage, and divided by the resistor R3, R4 and sent to a voltage feedback input pin VFB of the PWM controller U1. The voltage of a capacitor C6 will reflect a change of the output terminal VO.

Since the voltage of the output rectified diode D3 will drop based on the change of a nominal load and the voltage of the capacitor C6 will be affected by the duty cycle, therefore the voltage detection method by using the voltage of the primary-side capacitor C6 cannot fully reflect the variation of the output voltage VO of the secondary side. Therefore, the voltage regulation of the output voltage cannot provide a more stable voltage output. In addition, the output terminal is usually connected to a dummy load resistor R8 to prevent the output voltage drift to high limited potential at a light load condition, because it requires the connection of a dummy load resistor R8. As a result, the requirement of the regulation specified by the GREEN MODE that requires having an input power of less than 0.3 W at no load cannot be satisfied. In the meantime, this method does not provide an output current limit circuit, and thus the output current will increase when the output voltage decreased. A circuit protection depends on the primary-side current to detect a feedback signal of the resistor R6 to limit the output power. If the supply source voltage VCC is lower than the minimum working voltage of the PWM controller U1 and the PWM controller U1 is turned off, the PWM controller U1 will restart again after it is charged by the resistor R2 to the start voltage level, so that the overall output current and input power can be reduced effectively.

Figure 2:
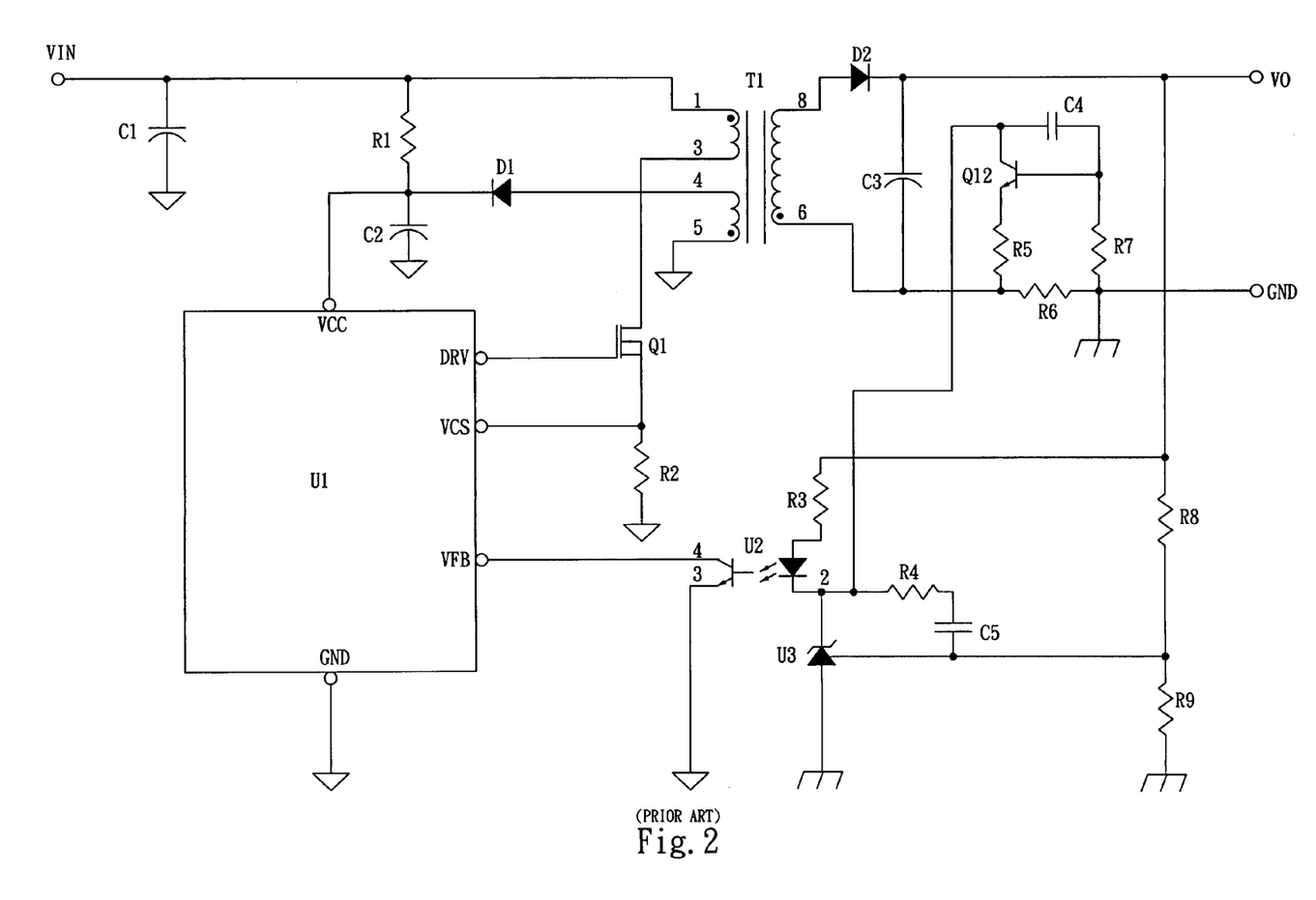
FIG. 2 is a circuit block diagram of a conventional secondary-side feedback switching power supply.

Referring to FIG. 2 for a circuit block diagram of a conventional secondary-side feedback switching power supply, the voltage at the output terminal VO is divided by resistors R8, R9 and inputted into the input terminal of a feedback voltage regulator U3, and the output terminal of the shunt regulator U3 controls a secondary-side LED current of a photo-coupler U2 that is converted into a primary-side current signal for controlling the voltage of a voltage feedback input pin VFB of the PWM controller U1. Under a stable output load, the voltage of the voltage feedback input pin VFB of the PWM controller U1 is constant. If the output load is changed, the voltage of the voltage feedback input pin VFB will be regulated to maintain a stable voltage output. Since the voltage exceeds the supply source voltage VCC, the primary-side auxiliary winding starts charging the capacitor C2 and supplies the voltage required by the supply source of the PWM controller U1. In FIG. 2, an output current limit circuit is formed at the secondary side by resistors R5, R6, R7, capacitor C4 and transistor Q12. If the voltage of the resistor R6 exceeds the voltage of a base-emitter junction of the transistor Q12, the current limit starts operating. The collector of the transistor Q12 controls the secondary-side LED current of the photo-coupler, so that the pulse width of the primary-side PWM controller U1 is restricted, and the output current limit may vary easily with the temperature drift due to the variation of base-emitter junction voltage, and thus the precision of the current limit operation will be low and is applicable for a low-price changer circuit only.

Figure 3:
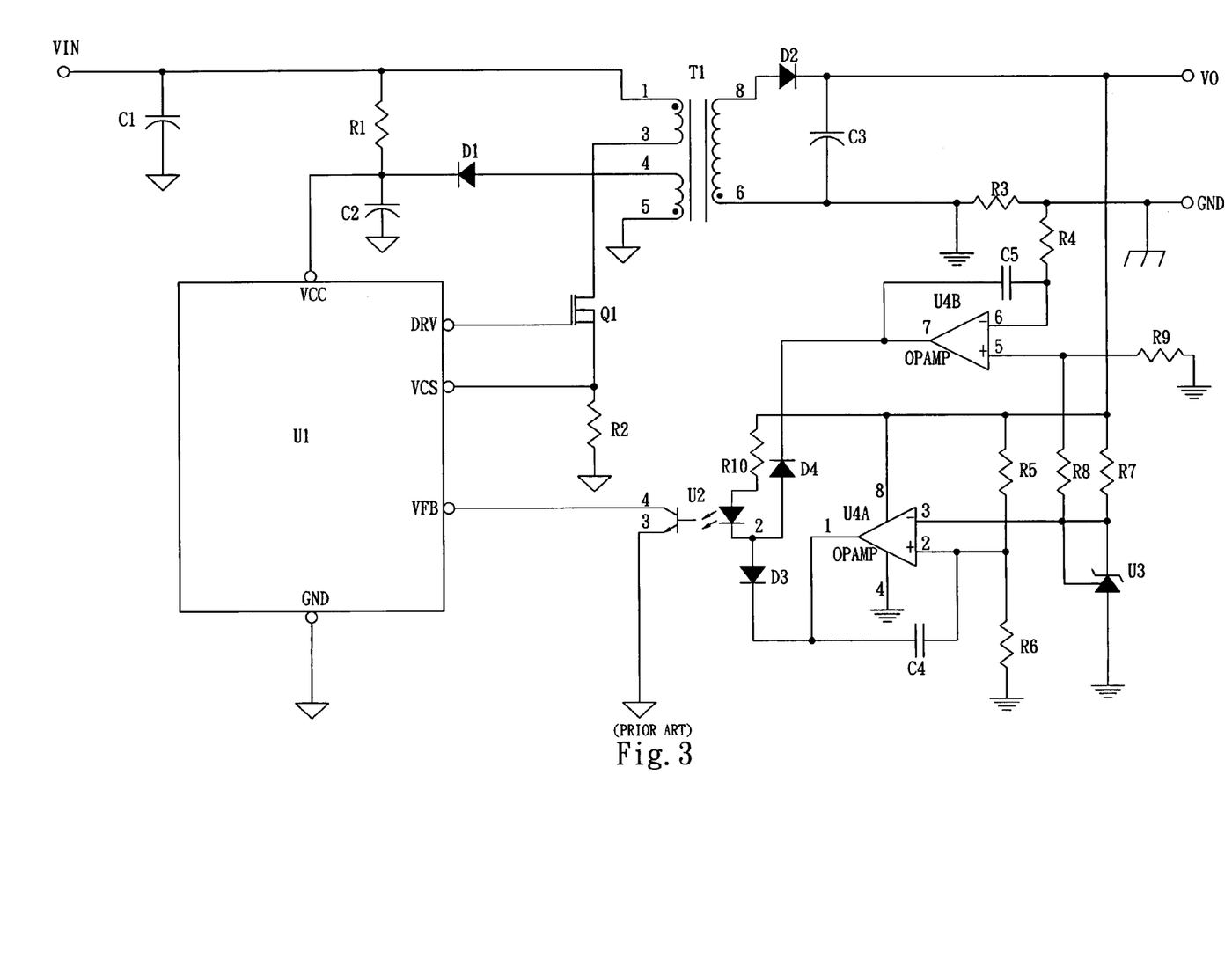
FIG. 3 is another circuit block diagram of a conventional secondary-side feedback switching power supply.

Referring to FIG. 3 for another circuit block diagram of a conventional secondary-side feedback switching power supply, the precision here is very high and applicable for a switching power supply with lager power and larger output current. Operational amplifiers U4A, U4B, a shunt regulator U3 and a photo-coupler U2 are used for the voltage feedback and output current limit circuits. The shunt regulator U3 is a voltage reference generator for providing a stable 2.5 V voltage reference to the voltage feedback operational amplifier U4A and the current limit operational amplifier U4B, the output terminals of the operational amplifier U4A and U4B to connect to a diode D3, D4, and then connect to a secondary-side LED terminal of the photo-coupler U2, for controlling the output pulse width of the primary-side PWM controller U1 to achieve the voltage regulation and current limit functions. This circuit is used very often due to its high precision, but it has the drawbacks of using many components and incurring a high cost.

Therefore, it is a subject of the present invention to design and develop a primary-side feedback switching power supply capable of maintaining a constant output current when the output current is restricted and the output voltage is dropped.

SUMMARY OF THE INVENTION

In view of the shortcomings of the prior art, the inventor of the present invention based on years of experience in the related industry to conduct researches and experiments, and finally developed a primary-side feedback switching power supply in accordance with the present invention, such that a sample-and-hold circuit can be used to obtain a corner voltage value of a harmonic wave voltage while the primary-side auxiliary winding is operating in a discontinuous mode as a feedback control for providing both voltage regulation and current limit functions. A stable voltage output is provided within the range of the input voltage and nominal output load, such that when the output reaches a current limit, the output voltage drops but the output current is controlled to remain unchanged, so as to provide an over-current protection.

Therefore, it is a primary objective of the present invention to provide a primary-side feedback switching power supply wherein a sample-and-hold circuit is used to obtain a corner voltage value of a harmonic wave voltage while the primary-side auxiliary winding is operating in a non-continuous mode as a feedback control for providing both voltage regulation and limit current functions, such that when the output reaches a current limit, the output voltage drops but the output current is controlled to remain unchanged, so as to provide an over-current protection.

To achieve the foregoing objective, the present invention provides a primary-side feedback switching power supply comprising: a flyback transformer having an primary winding, an auxiliary winding and a secondary winding, and the primary winding is connected to a power source; a power transistor connected to the primary winding; a primary-side feedback PWM controller having a sample-and-hold circuit connected to the auxiliary winding; an error amplifier connected to the sample-and-hold circuit; a voltage divider, connected to the sample-and-hold circuit; a multiplier connected to the voltage divider; a first comparator connected to the error amplifier and the power transistor; a second comparator connected to the first comparator and the multiplier; a power limit compensation circuit connected to the multiplier; a switch connected to the power source and the power limit compensation circuit; an output driver connected to the power transistor; a flip-flop connected to the output driver; an oscillator connected to the flip-flop; a leading edge blanking circuit connected to the flip-flop; an OR gate connected to the first comparator, the second comparator and the leading edge blanking circuit; such that if the voltage of the supply source reaches a voltage large enough to start the primary-side feedback PWM controller, a low voltage latching circuit UVLO will control the switch to be conducted electrically, and the power limit compensation circuit will produce a power limit compensation voltage to be sent to the multiplier input terminal; the oscillator will produce an electrically conducted signal to a S input terminal of the flip-flop, such that a Q output terminal of the flip-flop is changed from a low potential voltage to a high potential voltage, and the output driver electrically conducts the power transistor; and the voltage of the auxiliary winding is fed back to the sample-and-hold circuit to produce a voltage value, and the voltage value and a first voltage reference output an error amplified voltage from the error amplifier, and the error amplified voltage is divided by a plurality of resistors to produce a control voltage, and the control voltage is sent to a reverse input terminal of the first comparator; after the voltage value from another path is stepped down by the voltage divider, a product produced by a multiplier and a power limit compensation voltage is added to a limit current voltage reference produced by a second voltage reference, the limit current voltage reference is sent to a reverse input terminal of the first comparator; a source voltage of the power transistor is sent to a non-reverse input terminal of the first comparator and a non-reverse input terminal of the second comparator; if the source voltage is greater than the limit current voltage reference or the control voltage, an OFF signal will be generated and sent from the OR gate to the leading edge blanking circuit to produce a reset signal to a R input terminal of the flip-flop, the reset signal will change the high potential voltage at a Q output terminal of the flip-flop into a low potential voltage, and the output driver drives the power transistor to be electrically disconnected. When the output reaches a current limit, the output voltage drops but the output current is controlled to remain unchanged, so as to provide an over-current protection.

The above and other objects, features and advantages of the present invention will become apparent from the following detailed description taken with the accompanying drawing.

DETAILED DESCRIPTION OF THE PREFERRED EMBODIMENTS

To make it easier for our examiner to understand the objective, innovative features and performance of the present invention, we use a preferred embodiment and the accompanying drawings for a detailed description of the present invention.

Figure 4:
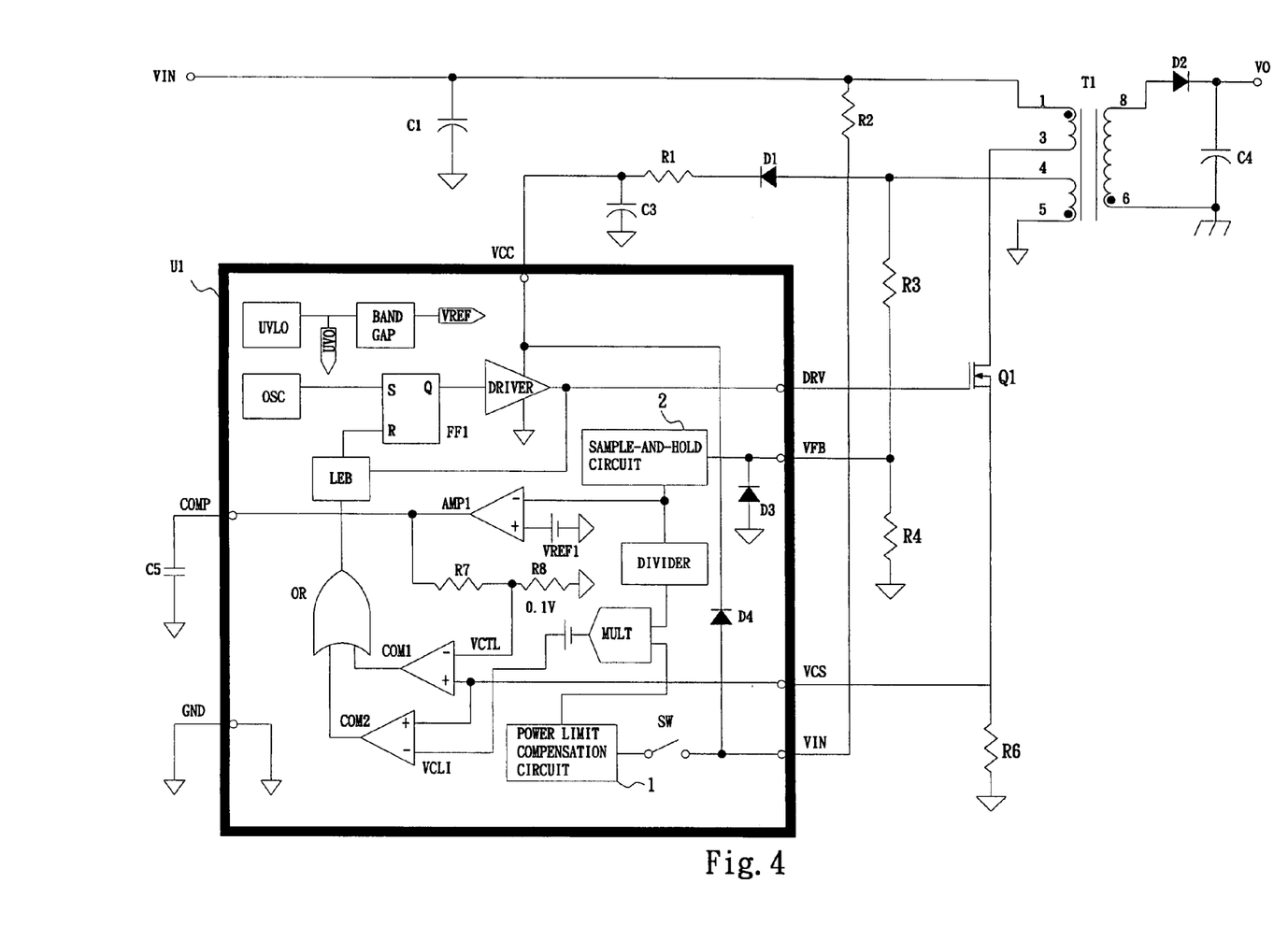
FIG. 4 is a circuit block diagram of a primary-side feedback switching power supply in accordance with a preferred embodiment of the present invention.
Figure 5:
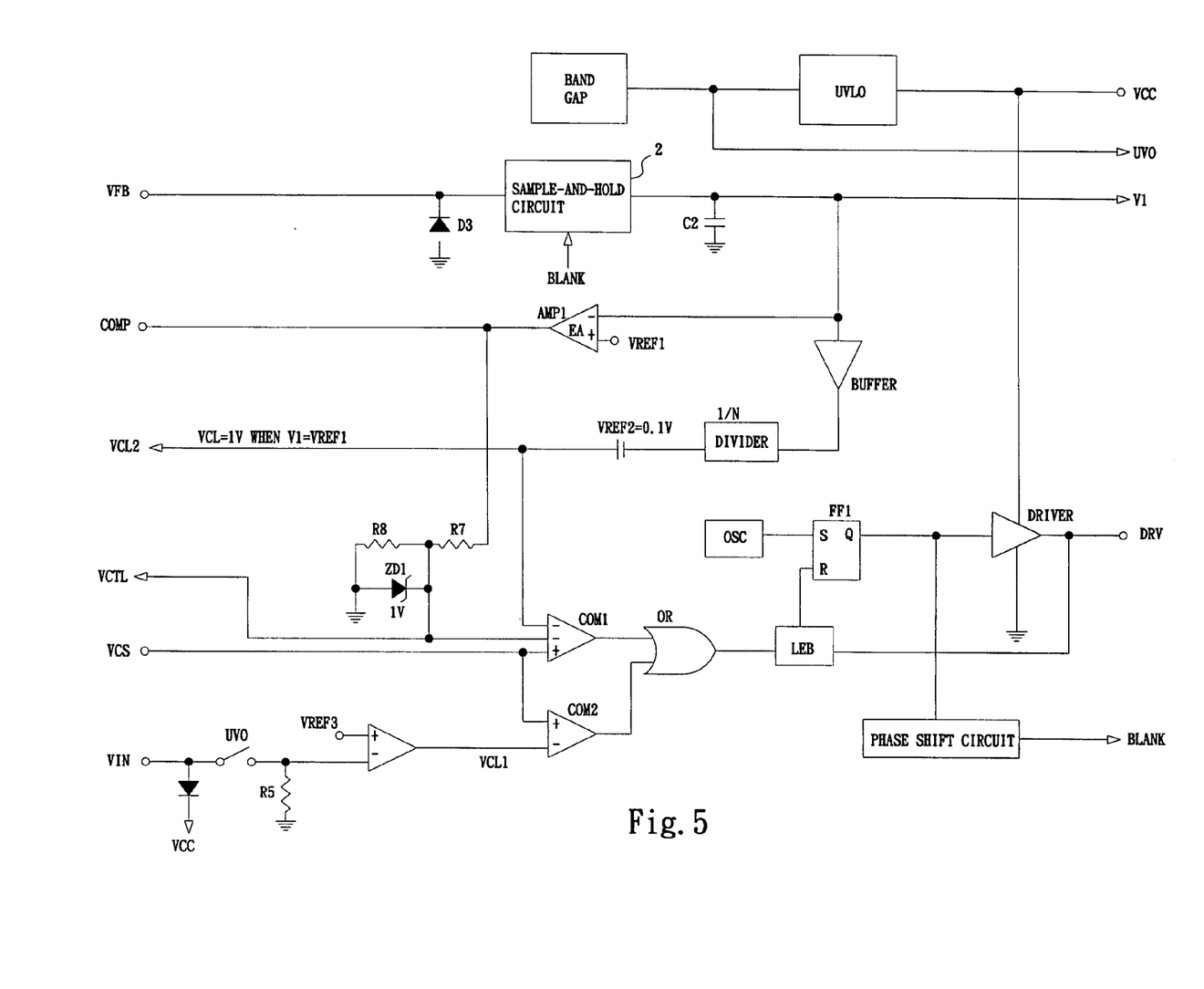
FIG. 5 is a circuit block diagram of a PWM controller as depicted in FIG. 4.
Figure 6:
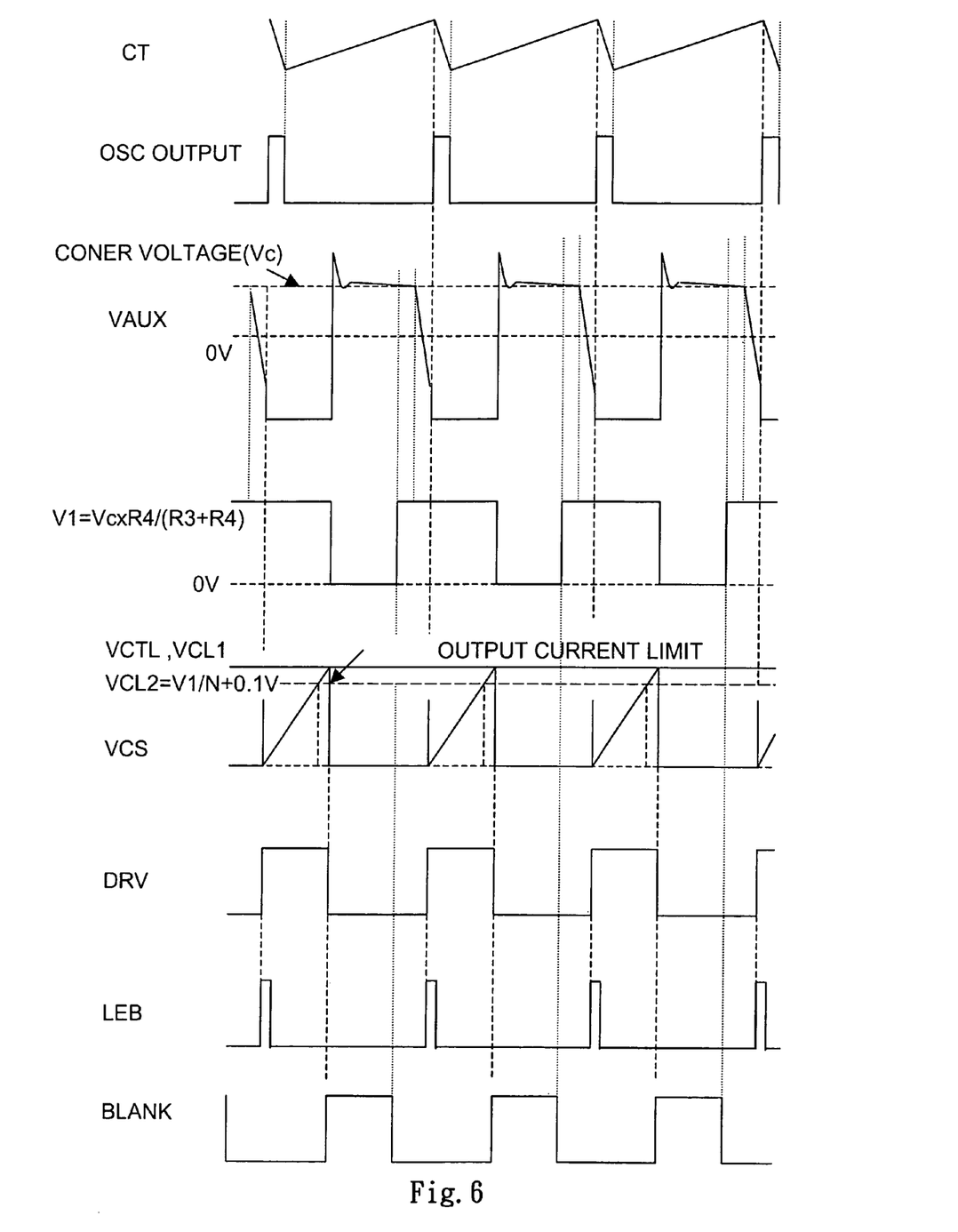
FIG. 6 is a waveform diagram of a control signal in accordance with a preferred embodiment of the present invention.

Referring to FIG. 4 for a circuit block diagram of a primary-side feedback switching power supply in accordance with a preferred embodiment of the present invention, FIG. 5 for a circuit block diagram of a PWM controller as depicted in FIG. 4 and FIG. 6 for a waveform diagram of a control signal of a preferred embodiment of the invention, a preferred embodiment of the primary-side feedback switching power supply comprises a flyback transformer T1 having an primary winding, an auxiliary winding and a secondary winding, primary winding connected to a power source; a power transistor Q1 connected to the primary winding; primary-side feedback PWM controller U1 and having a sample-and-hold circuit 2 connected to an auxiliary winding; an error amplifier AMP1 connected to the sample-and-hold circuit 2; a voltage divider DIVIDER connected to the sample-and-hold circuit 2; a multiplier MULT, connected to the voltage divider DIVIDER; a first comparator COM1 connected to an error amplifier AMP1 and a power transistor Q1; a second comparator COM2 connected to a first comparator COM1 and a multiplier MULT; a power limit compensation circuit 1 connected to the multiplier MULT; a switch SW connected to the power source and the power limit compensation circuit 1; an output driver DRIVER connected to the power transistor Q1; a flip-flop FF1 connected to the output driver DRIVER; an oscillator OSC connected to the flip-flop FF1; a leading edge blanking circuit LEB connected to the flip-flop FF1; an OR gate connected to the first comparator COM1, second comparator COM2 and leading edge blanking circuit LEB; if the power source voltage VCC of the resistor R2 charges a diode D4 to a voltage large enough to start the PWM controller U1, the PWM controller U1 will start operating, and the low voltage latching circuit UVLO outputs a UVO signal such that an internal voltage regulator circuit BAND GAP outputs a voltage reference and allows a compensation switch SW to be conducted electrically, and the resistor R2 is switched to a power limit compensation circuit 1 connected to the multiplier MULT, and the internal voltage dividing resistor produces a different power limit compensation voltage VPL due to a change of input voltage VIN, such that the power limit point of a high/low voltage input tends to be consistent. An oscillator OSC of the PWM controller U1 output an electrically conducted signal to a S input terminal of the flip-flop FF1 to change a low potential voltage at an output terminal Q of the flip-flop FF1 into a high potential voltage, and the first output driver DRIVER outputs a high potential voltage to change the power transistor Q1 to an electrically conducted state. The power source outputs a voltage at the starting stage and the voltages rise gradually from 0 V, and the limit current voltage reference VCL at an early stage is a low potential voltage, so that the conducting cycle of the PWM controller U1 is restricted by the limit current voltage reference VCL to output a voltage from a minimum conducting cycle and the auxiliary winding voltage gradually becomes higher to provide a SOFT START effect. On the other hand, the auxiliary winding starts producing a voltage due to the operation of the transformer, and the voltage is supplied through the diode D2, and the resistor R1 supplies the power source voltage VCC, and the corner voltage of the harmonic wave voltage while the auxiliary winding voltage is operating at a non-continuous mode is divided by the resistors R3, R4, and the voltage feedback input pin VFB obtains a divided voltage value through the sample-and-hold circuit 2 of the PWM controller U1 as a voltage value V1 for controlling internal voltage regulation and current limit functions. The voltage value V1 and the first voltage reference VREF1 output an amplified value of the error between the two by the error amplifier AMP1, and such error amplifier AMP1 output voltage terminal COMP is connected to a compensation component (such as a capacitor C5 or a component comprised of a capacitor and at least one resistor) for preventing the error amplifier AMP1 from being oscillated. The error amplified voltage divided by the resistors R7, R8 produces a control voltage VCTL, and the control voltage VCTL is connected to a reverse input terminal of the first comparator COM1, and the non-revise input terminal of the first comparator COM1 is connected to a current detection resistor R6 for detecting a primary-side current detection voltage VCS, and the primary-side current detection voltage VCS of the non-reverse input terminal is compared with the reverse input terminal of the control voltage VCTL. If the primary-side current detection voltage VCS is greater than a control voltage VCTL, an OFF signal will be generated and sent from an OR gate to a leading edge blanking circuit LEB to eliminate the leading edge noise voltage of the primary-side current detection voltage VCS and then output a reset signal to a R input terminal of the flip-flop FF1, such that the high potential voltage of the flip-flop FF1 output terminal Q is changed to a low potential voltage. Therefore, the first output driver DRIVER outputs a low potential voltage to change the power transistor Q1 to off state. The oscillator OSC of the PWM controller U1 outputs the conducting pulse signal to the S input terminal of the flip-flop FF1 to change the low potential voltage of both flip-flop FF1 and output terminal Q to a high potential voltage again. The first output driver DRIVER outputs a high potential voltage again to change the power transistor Q1 to an electrically conducted state. The control voltage VCTL and primary-side current detection voltage VCS are compared to produce an OFF signal and sent through the OR gate to the leading edge blanking (LEB) circuit to eliminate the front edge noise voltage of the primary-side current detection voltage VCS again, and then a reset signal is outputted to a R input terminal of the flip-flop FF1 to change the high potential voltage of the flip-flop FF1 output terminal Q to a low potential voltage. The first output driver DRIVER controls to maintain the power transistor Q1 to be off state till next pulse signal is send to the S input terminal of the flip-flop FF1. The foregoing procedure is repeated to produce and control a stable output. The power limit compensation voltage VPL of the primary-side feedback PWM controller U1 in accordance with the present invention is produced by dividing the voltage of the power source by a resistor and sending the divided voltage to a reverse input terminal of a subtractor 3 and comparing the divided voltage with a third voltage reference VERF3. The limit current voltage reference VCL is produced by an output voltage value V1 of the voltage value of the sample-and-hold circuit 2 multiplied by 1/N of the voltage regulation through the voltage divider DIVIDER. The power limit compensation voltage VPL is inputted and added by a multiplier MNLT to produce the second voltage reference VREF2. The voltage reference VREF2 is usually set to a very small voltage value, so that the duty cycle at the stage of starting the power source is changed from small to large to prevent the output current and voltage from exceeding the limit. The limit current voltage reference VCL varies with the voltage of the output terminal VO, and thus it can control the output current within a nominal range.

In summation of the description above, the voltage feedback input pin VFB is connected to a diode D3 for clamping the negative voltage of the voltage feedback input pin VFB at negative voltage level VD (approximately equal to 0.7 V), and the voltage feedback input pin VFB obtains a harmonic wave corner voltage value from the sample-and-hold circuit 2 and stores such value in the capacitor C2. On the other hand, a control voltage VCTL produced by the corner voltage value through a first error amplifier AMP1 and resistors R7, R8 is added to a limit current voltage reference VCL produced by the second voltage reference VREF2 through a buffer BUFFER, a voltage divider DIVIDER, and a multiplier MULT, and the limit current voltage reference VCL is equal to the product of the output voltage of the voltage divider DIVIDER and the power limit compensation voltage VPL plus the value of the second voltage reference VREF2. The input voltage VIN is passed through a compensation switch SW and divided by a resistor R5 to produce a divided voltage to be inputted to the reverse input terminal of the input subtractor 3 and compared with a third voltage reference VREF3 to output a power limit compensation voltage VPL. The primary-side current detection voltage VCS is compared with the limit current voltage reference VCL and the control voltage VCTL separately. If the primary-side current detection voltage VCS is greater than any one of the voltages, an OFF signal will be outputted, and the OFF signal is passed through an OR gate and a leading edge blanking circuit LEB to eliminate a leading edge noise voltage of the primary-side current detection voltage VCS, and then a reset signal is outputted to a R input terminal of the flip-flop FF1, so that the high potential voltage at an output terminal Q of the flip-flop FF1 is changed to a low potential voltage, and thus the first output driver DRIVER outputs a low potential voltage to change the power transistor Q1 to be off state. A phase shift circuit PHASE SHIFT produces a blank signal BLANK to be inputted to the sample-and-hold circuit 2, such that the timing for a circuit to take a sample occurs after a blank signal BLANK to avoid sampling in a voltage ringing area of the voltage feedback input pin VFB.

Figure 7:
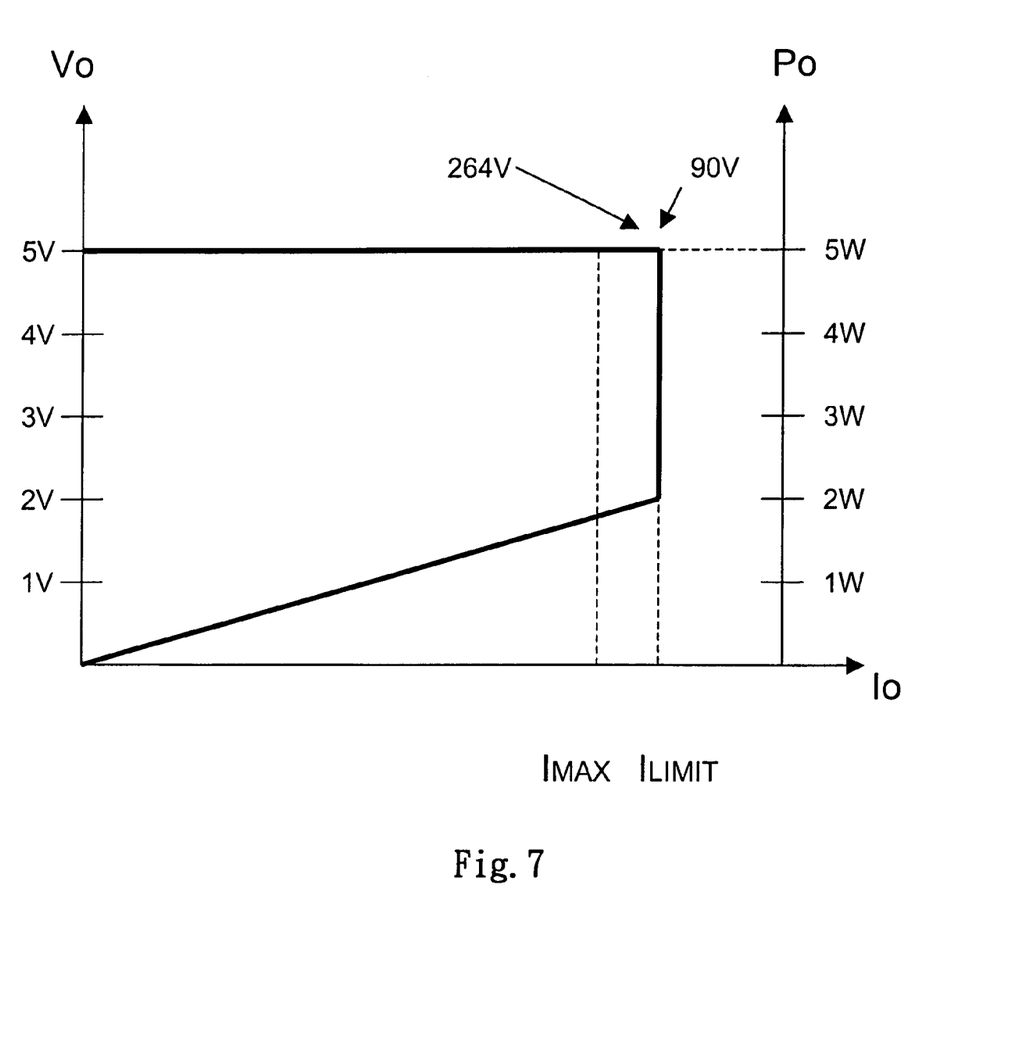
FIG. 7 is a curve of an ideal output limit current of the present invention.

Referring to FIG. 7 for a curve of an ideal output current limit of the invention, the maximum output current is limited by the limit current value, and the output current is returned if the output voltage is dropped to a predetermined value.

Figure 8:
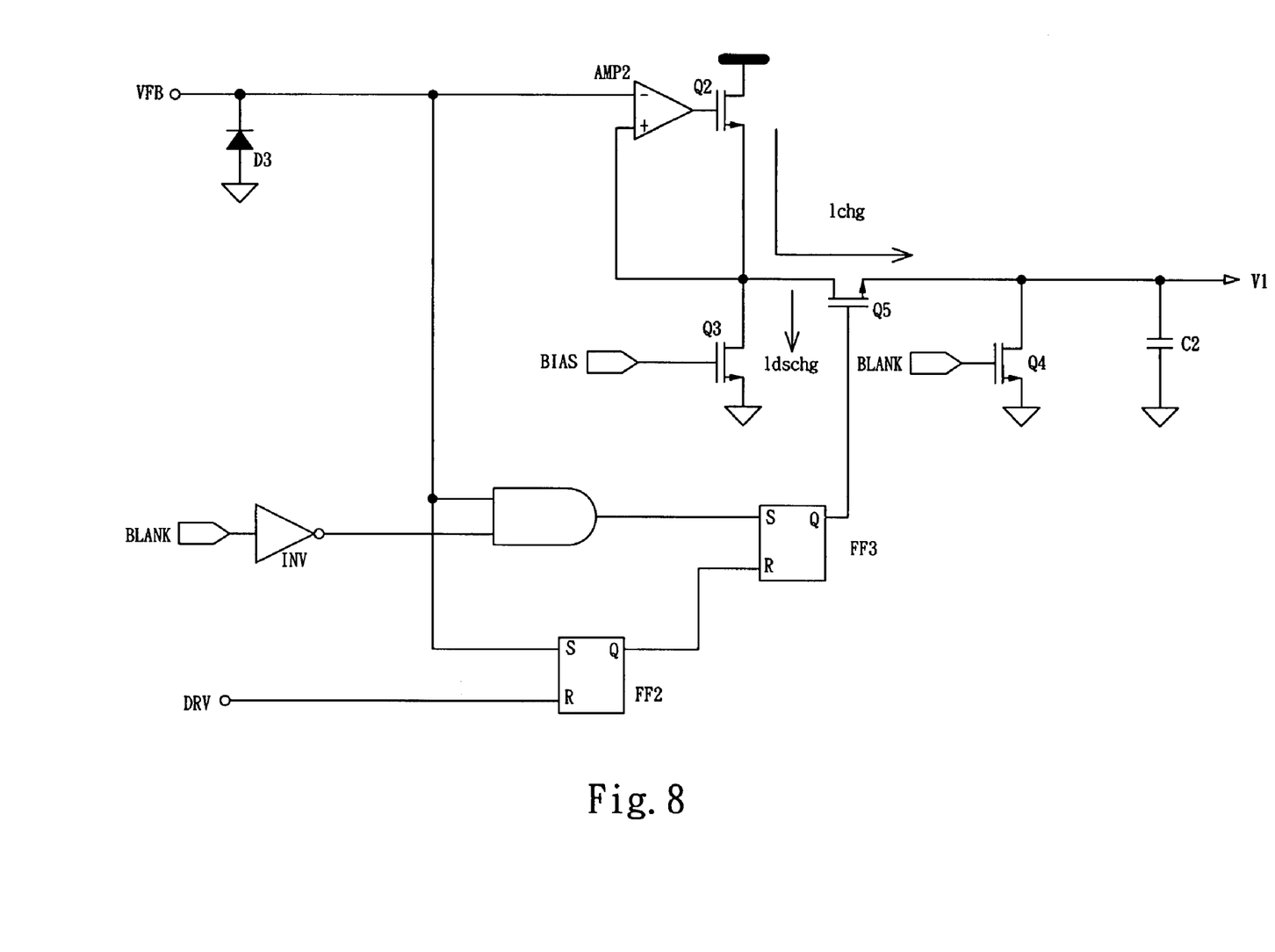
FIG. 8 is a circuit block diagram of a sample-and-hold circuit in a primary-side feedback switching power supply in accordance with a preferred embodiment of the present invention.

Referring to FIG. 8 for a circuit block diagram of a sample-and-hold circuit of a primary-side feedback switching power supply in accordance with a preferred embodiment of the present invention, a flatter voltage level of a voltage of a voltage feedback input pin VFB after a blank signal BLANK is stored for tracking a change of voltage. If the voltage of the voltage feedback input pin VFB reaches a level of having harmonic waves and enters into another a voltage change with a steep slope, the voltage V1 obtained from the sample-and-hold circuit will immediately stop tracking the voltage change of the voltage feedback input pin VFB and store the corner voltage value as a control voltage for controlling the internal voltage regulation and current limit as shown in FIG. 8. The blank signal BLANK will control the transistor Q4 to be conducted electrically connect to discharge the voltage V1 to zero. Until the blank signal BLANK stops discharging, a voltage follower is formed when the voltages of the operational amplifier AMP2 and the transistor Q2 are at a flatter slope, and the voltage of the voltage feedback input pin VFB is sent and stored in the capacitor C2, and the voltage of the capacitor C2 is the control voltage V1. A bias voltage BIAS controls the transistor Q5 to be electrically conducted to generate a discharge current Idschg, and the discharge current Idschg is set to be much smaller than the charge current Ichg of the voltage follower for producing a voltage change corresponding to the voltage of the voltage feedback input pin VFB. The voltage of the voltage feedback input pin VFB and the inverted phase signal of the blank signal BLANK are inputted through an and gate AND into a flip-flop FF3 to control the transistor Q5 to be electrically connected or disconnected, so as to obtain a voltage V1. To prevent the flip-flop FF2 at the first harmonic wave from being triggered accidentally, the sample-and-hold circuit can obtain a corner voltage value of the harmonic wave voltage operated at a non-continuous mode as a feedback control.

In summation of the description above, the present invention uses a sample-and-hold circuit to obtain a corner voltage value when the primary-side auxiliary winding is operating at a discontinuous mode as a feedback control. If the output reaches a current limit and the output voltage drops, but the output current is control to remain unchanged, so as to achieve the over-current protection. Products derived from the present invention can be used to fully satisfy the current market requirements, and thus the present invention is compliant with the patent application requirements and duly filed for patent application.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A primary-side feedback switching power supply, comprising:
a flyback transformer, having a primary winding, an auxiliary winding and a secondary winding, and said primary winding being connected to a power source;
a power transistor, connected to said primary winding;
a primary-side feedback PWM controller, comprising:
a sample-and-hold control circuit, connected to said auxiliary winding;
an error amplifier, connected to said sample-and-hold circuit;
a voltage divider, connected to said sample-and-hold circuit;
a multiplier, connected to said voltage divider;
a first comparator, connected to said error amplifier and said power transistor;
a second comparator, connected to said first comparator and said multiplier;
a power limit compensation circuit, connected to said multiplier;
a switch, connected to said power source and said power limit compensation circuit;
an output driver, connected to said power transistor;
a flip-flop, connected to said output driver;
an oscillator, connected to said flip-flop;
a leading edge blanking circuit, connected to said flip-flop;
an OR gate, connected to said first comparator, said second comparator and said leading edge blanking circuit;
such that if the supply source voltage reaches a turning on threshold level to start said primary-side feedback PWM controller, a low voltage latching circuit will control said switch to be conducted electrically, and said power limit compensation circuit will produce a power limit compensation voltage to be sent to said multiplier input terminal; said oscillator will produce an electrically conducted signal to a S input terminal of said flip-flop, such that a Q output terminal of said flip-flop is changed from a low potential voltage to a high potential voltage, and said output driver electrically conducts said power transistor; and the voltage of said auxiliary winding is fed back to said sample-and-hold circuit to produce a voltage value, and said voltage value and a first voltage reference output an error amplified voltage from said error amplifier, and said error amplified voltage is divided by a plurality of resistors to produce a control voltage, said control voltage is sent to a reverse input terminal of said first comparator; after said voltage value is stepped down by said voltage divider and said power limit compensation voltage is inputted into said multiplier, the output voltage of said multiplier together with a second voltage reference produces a limit current voltage reference to be sent to a reverse input terminal of said second comparator; a source voltage of said power transistor is sent to a non-reverse input terminal of said first comparator and a non-reverse input terminal of said second comparator; if said source voltage is greater than said control voltage or said limit current voltage reference, an OFF signal will be generated and sent from said OR gate to said leading edge blanking circuit to produce a reset signal to a R input terminal of said flip-flop, said reset signal will change the high potential voltage at a Q output terminal of said flip-flop into a low potential voltage, and said output driver drives said power transistor to be off state.

2. The primary-side feedback switching power supply of claim 1, wherein said error amplifier is connected to a compensation component for preventing said error amplifier from being oscillated.

3. The primary-side feedback switching power supply of claim 2, wherein said compensation component is at least one capacitor or at least one capacitor connected to at least one resistor.

4. The primary-side feedback switching power supply of claim 1, wherein said first comparator and said second comparator have non-reverse input terminals connected to a current detection resistor.

5. The primary-side feedback switching power supply of claim 1, wherein the voltage of said power source is divided by a resistor and sent to a reverse input terminal of a subtractor and compared with a third voltage reference to produce said power limit compensation voltage.

6. The primary-side feedback switching power supply having an output current limit of claim 1, further comprising a buffer disposed between said sample-and-hold circuit and said voltage divider.

7. The primary-side feedback switching power supply having an output current limit of claim 1, wherein said sample-and-hold circuit uses a flatter voltage level of a voltage of a voltage feedback input pin after a blank signal to store and track a flatter voltage change, such that if the voltage of said voltage feedback input pin reaches a voltage where a harmonic wave starts turning into another steep slope, the voltage value obtained from said sample-and-hold circuit will immediately stop tracking the voltage change of said voltage feedback input pin, and will store a corner voltage value as a control voltage for controlling an internal voltage regulation and a limit current.

* * * * *